United States Patent
Haikin et al.

(10) Patent No.: US 8,760,551 B2
(45) Date of Patent: Jun. 24, 2014

(54) SYSTEMS AND METHODS FOR IMAGE CAPTURING BASED ON USER INTEREST

(75) Inventors: John S. Haikin, Fremont, CA (US); Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 760 days.

(21) Appl. No.: 13/039,016

(22) Filed: Mar. 2, 2011

(65) Prior Publication Data

US 2012/0224077 A1    Sep. 6, 2012

(51) Int. Cl.
*H04N 5/222* (2006.01)
*H04N 5/76* (2006.01)

(52) U.S. Cl.
USPC .................. 348/333.02; 348/231.3

(58) Field of Classification Search
None
See application file for complete search history.

(56) References Cited

U.S. PATENT DOCUMENTS

| | | |
|---|---|---|
| 6,215,471 B1 | 4/2001 | DeLuca |
| 2003/0081834 A1 | 5/2003 | Philomin |
| 2004/0100567 A1 | 5/2004 | Miller |
| 2004/0101212 A1 | 5/2004 | Fedorovskaya |
| 2004/0161082 A1 | 8/2004 | Brown |
| 2004/0212695 A1 | 10/2004 | Stavely |
| 2004/0212712 A1 | 10/2004 | Stavely |
| 2007/0086764 A1 | 4/2007 | Konicek |
| 2007/0201731 A1 | 8/2007 | Fedorovskaya |
| 2008/0218472 A1 | 9/2008 | Breen |
| 2009/0295738 A1 | 12/2009 | Chiang |
| 2010/0157099 A1* | 6/2010 | Nakai ............. 348/231.99 |

FOREIGN PATENT DOCUMENTS

RU    2227930 C2    4/2004

* cited by examiner

*Primary Examiner* — Justin P Misleh
(74) *Attorney, Agent, or Firm* — Canon U.S.A., Inc. IP Division

(57) ABSTRACT

An image capturing apparatus, method, and storage medium identifying image metadata based on user interest. The image capturing apparatus includes a first image capturing unit configured to capture an image of a scene for a user, a second image capturing unit configured to capture an image of the user, an identification unit configured to identify at least one region of interest of the scene based on a combination of eye and facial characteristics of the user of the image capturing apparatus during an image capturing operation, a processing unit configured to analyze at least facial characteristics of the user associated with each region of interest during the image capturing operation, a determining unit configured to determine a facial expression classification associated with each region of interest based on corresponding analyzed facial characteristics for each region during the image capturing operation, a recording unit configured to record facial expression metadata based on information representing the at least one region of interest and the facial expression classification associated with an image captured during the image capturing operation, and a rendering unit configured to render the image using the recorded facial expression metadata.

20 Claims, 5 Drawing Sheets

SYSTEMS AND METHODS FOR IMAGE CAPTURING BASED ON USER INTEREST

BACKGROUND OF THE INVENTION

1. Field of the Invention

The present invention generally relates to image processing and, more particularly, to an image capturing apparatus, method, and storage medium identifying image metadata based on user interest.

2. Description of the Related Art

Image capturing apparatuses, such as digital still cameras, digital video cameras, cameras contained within portable communication terminals (e.g., cell phones), and/or the like, are widely used for a variety of purposes. For example, photographers use cameras for obtaining images in the form of individual or group portraits, scenery, travel, wilderness, sports, and/or the like.

Cameras normally include a view finder and an LCD (liquid crystal display) device. The view finder and the LCD device enable the photographer to view a subject prior to capturing an image of the subject by pressing a shutter release button or the like. The LCD device is normally provided on the rear of the camera and shows a preview of the scene that the camera will capture when the shutter is pressed.

When a photographer looks at the LCD device to view the subject, there may be a number of areas of the scene that are more appealing to the photographer than others. Photographers can do several things to highlight an appealing area of a scene prior to pressing the shutter. For example, the photographer can contrast colors to set an area of interest apart from the surrounding area. The photographer can also place the area of interest in a prominent position on the LCD device. The photographer can also enlarge the area of interest, blur out other aspects outside the area of interest, e.g., in front of or behind the area of interest, and contrast shapes and textures to make the area of interest stand out.

Use of focusing spots in an image provides a simple means to identify areas of interest in a scene, but these spots are placed in a fixed arrangement in a camera system. When framing an image in the view finder, the focusing spots do not often lie exactly on an area of interest. The photographer then must either reframe the scene or accept a suboptimal choice by the camera.

Cameras are currently not provided with a simple technique enabling a photographer to identify an area of interest in a scene. Imaging technology provides the means to analyze photographs of an eye and determine what direction the eye is looking U.S. Patent Application Publication No. 2008/0266129 A1, published on Oct. 30, 2008 (hereinafter, the Chiang application), discloses a computing device with a hybrid memory and an eye control unit. The Chiang application describes a computing device that incorporates an eye control system for controlling a mouse-like user interface.

However, eye position may not be an accurate indicator of user interest, since a user's eye may be directed to an object that the user is trying to eliminate from a captured scene. Additionally, photographers may like to render one or more areas of interest in a captured scene differently from the rest of the captured scene, for example by rendering an area of interest using different gamut mapping than is used to render other areas of the captured scene. Thus, a need exists for systems and methods for identifying areas of user interest in a scene, thereby enhancing the quality of user photographs.

SUMMARY OF THE INVENTION

According to an aspect of the present invention, an image capturing apparatus is provided including a first image capturing unit configured to capture an image of a scene for a user; a second image capturing unit configured to capture an image of the user; an identification unit configured to identify at least one region of interest in the scene based on a combination of eye and facial characteristics of the user of the image capturing apparatus during an image capturing operation; a processing unit configured to analyze at least facial characteristics of the user associated with each region of interest during the image capturing operation; a determining unit configured to determine a facial expression classification associated with each region of interest based on corresponding analyzed facial characteristics for each region during the image capturing operation; a recording unit configured to record facial expression metadata based on information representing the at least one region of interest and the facial expression classification associated with an image captured during the image capturing operation; and a rendering unit configured to render the image using the recorded facial expression metadata.

Further features and aspects of the present invention will become apparent from the following detailed description of exemplary embodiments with reference to the attached drawings.

BRIEF DESCRIPTION OF THE DRAWINGS

The accompanying drawings illustrate certain embodiments, features, and aspects of the invention, and, together with the description, serve to explain the principles of the present invention.

DETAILED DESCRIPTION OF THE EMBODIMENTS

Illustrative embodiments of the invention will now be described in detail below with reference to the accompanying drawings, but the present invention is not limited to these illustrative embodiments.

Figure 1:
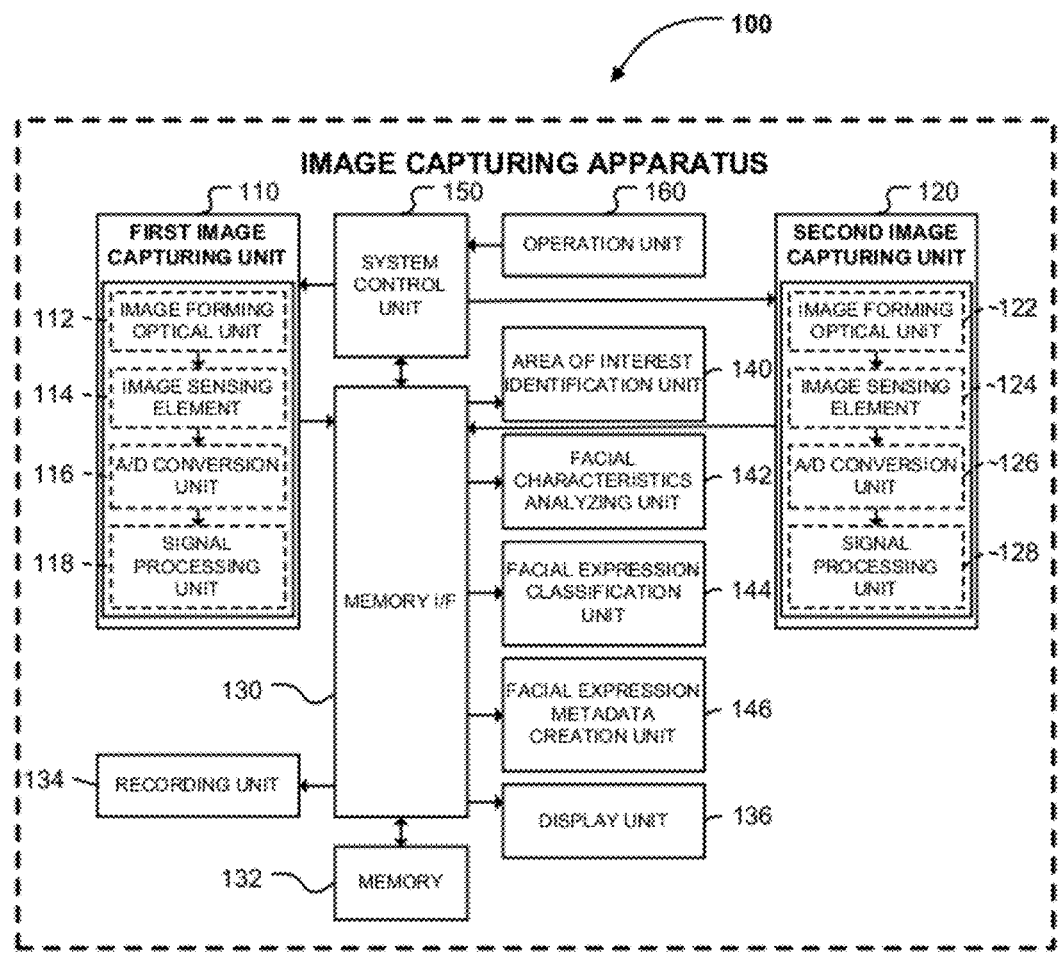
FIG. 1 is a block diagram illustrating a configuration of one embodiment of an image capturing apparatus.

FIG. 1 illustrates one embodiment of an image capturing apparatus 100. The image capturing apparatus 100 includes a first image capturing unit 110 and a second image capturing unit 120. The first image capturing unit 110 is configured to obtain an image of a scene desired by a user (e.g., a photographer) of the image capturing apparatus 100. The second image capturing unit 120 is configured to obtain an image of the user while the user is viewing or capturing an image via the first image capturing unit 110. While the image capturing apparatus 100 is represented as a digital still camera in FIGS. 3A and 3B for exemplary purposes, the image capturing apparatus 100 may be configured in a variety of other forms that include some type of image capturing device that is similar to camera. For example, the image capturing apparatus 100 may be configured as a digital video camera, a portable communication terminal (e.g., a cell phone), a pager, a radio telephone, a personal digital assistant (PDA), a Moving Pictures Expert Group Layer 3 (MP3) player, and/or the like.

The first image capturing unit 110 includes, among other components, an image forming optical unit 112, an image sensing unit 114, an A/D conversion unit 116, and a signal processing unit 118. The first image capturing unit 110 may also include a variety of other functional units that are not shown. The second image forming unit 120 similarly includes an image forming optical unit 122, an image sensing unit 124, an A/D conversion unit 126, and a signal processing unit 128. The second image capturing unit 120 may also include a variety of other functional units that are not shown. Each of the image forming optical units 112 and 122 includes a lens and stop, and each one adjusts focus and exposure. Each of the image sensing elements 114 and 124 can be configured as, for example, a CCD (Charge-Coupled Device) sensor, a CMOS (Complementary Metal-Oxide Semiconductor) sensor, or the like, and each converts an optical image into an electrical signal.

Each of the A/D (Analog to Digital) conversion units 116 and 126 converts an analog image signal output from the respective image sensing elements 112 and 122 into a digital image signal. Each of the signal processing units 118 and 128 performs gamma processing, interpolation processing, matrix transformation, and/or the like for an output signal from the respective A/D conversion units 116 and 126, and generates an image signal.

The second image capturing unit 120 can detect facial characteristics of the user, such as the eyes, nose, mouth, etc., from individual images of the user or from a series of periodic images (e.g., a video data stream). The second image capturing unit 120 may capture facial structure and reflectance properties of the user's face. The image capturing apparatus 100 may include a facial illumination system in the form of multiple light sources or projectors (not shown). The facial illumination system can be positioned at any suitable location and produce a structured pattern that is projected onto the user's face. This pattern enables structural information or data pertaining to a three dimensional (3-D) shape of the user's face to be captured by the second image capturing unit 120. For example, infrared light source(s) may be employed that emit a pattern of light in the infrared spectrum. Additionally, any other suitable light source can be used.

Moreover, such light source(s) can produce light that enables the second image capturing unit 120 to capture a diffuse component of the face's reflectance property. Using multiple and different light sources, such as an infrared light source in combination with a polarized light source, which can be an infrared light source as well, enables the second image capturing unit 120 to simultaneously or contemporaneously capture structural information or data about the face and reflectance information or data about the face. The structural information describes 3-dimensional aspects of the face while the reflectance information describes diffuse reflectance properties of the face. This information is then processed by the signal processing unit 128 to provide information or data that can be used for further facial analysis.

The second image capturing unit 120 may be configured to activate when the user depresses a shutter switch 172 to capture an image. Alternatively, the image capturing apparatus 100 may be configured with a facial expression mode or setting that a user can select. In such a case, the user may configure the image capturing apparatus 100 to manually and/or automatically activate the second image capturing unit 120 when the shutter switch 172 is depressed.

The image capturing apparatus 100 also includes a memory I/F (interface) 130, a memory 132, a recording unit 134, a display unit 136, an area of interest identification unit 140, a facial characteristics analyzing unit 142, a facial expression classification unit 144, a facial expression metadata creation unit 146, a system control unit 150, and an operation unit 160. The memory I/F 130 writes and reads image signals and various control signals in and from the memory 132, and the memory 132 can temporarily store an image signal and/or the like. The memory 132 includes a computer readable medium, for example, one or more memory devices for storing, among other things, program code, image data, image metadata, and/or the like. The recording unit 134 compresses image data and records the data on a computer readable medium. The display unit 136 displays image data. The components of the image capturing apparatus 100 may be interconnected to one another via various bus lines, wiring, and/or the like. The image capturing apparatus 100 may include a variety of other devices or components.

The memory 132 also stores constants, variables, and programs to be used in operations of the system control unit 150. The memory 132 can be configured as any combination of volatile and non-volatile memory. Basic routines to transfer information between components within the image processing apparatus 100 are stored in the non-volatile portion of the memory 132.

The display unit 136 may be a liquid crystal display (LCD) panel, a thin-film transistor LCD (TFT-LCD) panel, an organic light emitting diode (OLED) display panel, a transparent OLED (TOLED) display panel, a flexible display panel, a three-dimensional (3D) display panel, and/or the like. The display unit 136 displays images of scenes to be recorded by the user and displays an operation state or a message (e.g., by using characters, images, etc.) according to execution of a program by the system control unit 150. One or more display units 136 may be positioned so that they are easily visible to a user. A display unit 136 may be installed within an optical finder (not shown) and present indications of in-focus, camera-shake warning, flash charge, shutter speed, aperture value, exposure correction, and/or the like.

The display unit 136 may be configured to accept touch-screen inputs and keypad/functional/hot buttons into a user interface display. The image capturing apparatus 100 may also incorporate additional user interface buttons, dials, switches, trackballs, joysticks, keypads, and/or the like in order to receive user inputs. User inputs may also be provided via voice recognition via a microphone.

The contents of the display unit 136 may include indications of imaging device 100 settings and operations, for example single shot/continuous shooting, self-timer, a compression rate, a number of recorded pixels, a number of recorded shots, a remaining number of shots, a shutter speed, an aperture value, exposure correction, electronic flash, red-eye reduction, F-number, macro shooting, buzzer setting, remaining amount of a clock battery, remaining amount of batteries, error information, information in a plurality of digits, a detached/attached state of a recording medium, a communication interface operation, date, and time.

The area of interest identification unit 140 identifies an area of interest of the user based on detected eye characteristics of the user. The facial characteristics analyzing unit 142 analyzes facial characteristics of the user. The facial expression classification unit 144 determines a facial classification of the user based on the analyzed facial characteristics of the user. The facial expression metadata creation unit 146 creates facial expression metadata based on the facial classification of the user and associates the facial expression metadata with the identified area of interest. The operation unit 160 includes a shutter switch and various other input devices, such keys, buttons, other switches and/or the like, that are associated with user operation. A system control unit 150 (e.g., a processor) executes various control operations associated with any of the units in the image capturing apparatus 100.

Figure 2:
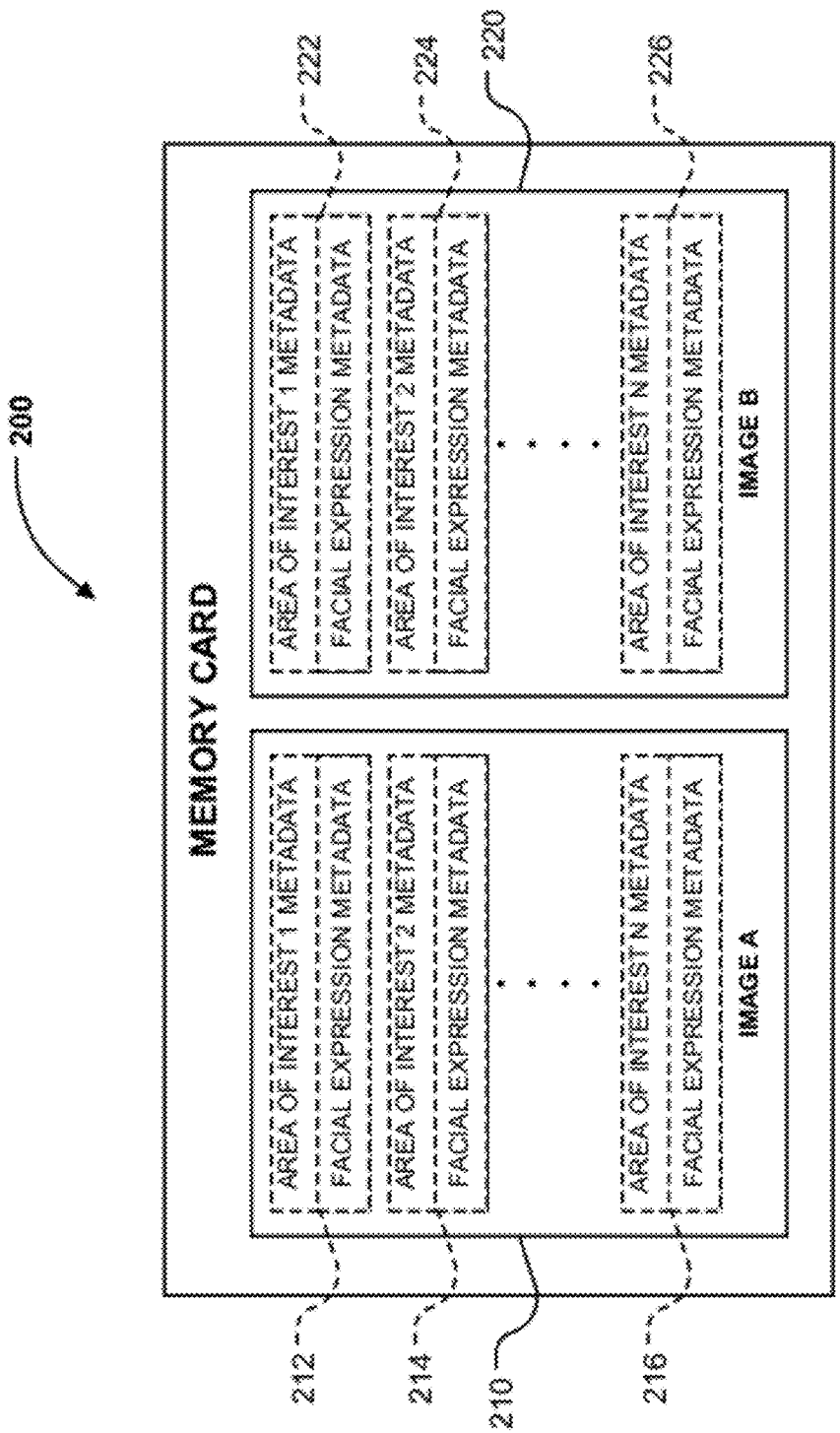
FIG. 2 is a block diagram illustrating a configuration of one embodiment of a memory card.

FIG. 2 is a block diagram illustrating a configuration of one embodiment of a memory card 200. The memory card 200 may conform with Personal Computer Memory Card International Association standards (PCMCIA cards), secure digital (SD) standards, compact flash (CF) card standards, and/or other standards. While this embodiment shows a memory card 200, other computer readable medium may be used in addition to or in alternative to a memory card 200, including, for example, a floppy disk, a hard disk, an optical disk, a magneto-optical disk, a USB device, a CD-ROM (Compact Disc (CD) Read Only Memory), a CD-R (CD Recordable), CD-RW (CD Rewritable), a magnetic tape, a non-volatile memory card, and a ROM.

The memory card 200 can store data including, but not limited to, images (e.g., image A 210 and image B 220), management information associated with the image data, and/or program code that can be transmitted and received between other peripheral devices, for example a computer or a printer. Image A 210 has associated and/or stored thereon a variety of metadata including, for example, metadata 212, 214, and 216, and image B 220 has associated and/or stored thereon a variety of metadata including, for example, metadata 222, 224, and 226. Metadata 212, 214, . . . 216 each represent area of interest metadata and facial expression metadata associated with image A 210, e.g., area of interest 1 metadata, facial expression metadata associated with area of interest 1, area of interest 2 metadata, facial expression metadata associated with area of interest 2. Similarly, metadata 222, 224, . . . 226 each represent area of interest metadata and facial expression metadata associated with image B 220, e.g., area of interest 1 metadata, facial expression metadata associated with area of interest 1, area of interest 2 metadata, facial expression metadata associated with area of interest 2. The metadata can be configured as, for example, Exif (Exchangeable image file format), XMP (Extensible Media Platform), PLUS (Picture Licensing Universal System), Dublin Core (Dublin Core Metadata Initiative), IPTC Information Interchange Model IIM (International Press Telecommunications Council), IPTC Core Schema for XMP, and/or the like.

Additionally, the memory card 200 may include an interface and/or connector. In such a case, communication cards, such as a local area network (LAN) card, a modem card, a universal serial bus (USB) device, an Institute of Electrical and Electronics Engineers (IEEE) 1394 card, etc., can be connected. According to this configuration, image data and management information attached to the image data can be displayed on the display unit 136 and can also be transmitted and received between other peripheral devices, such as a computer, a printer, and/or the like.

Figure 3A:
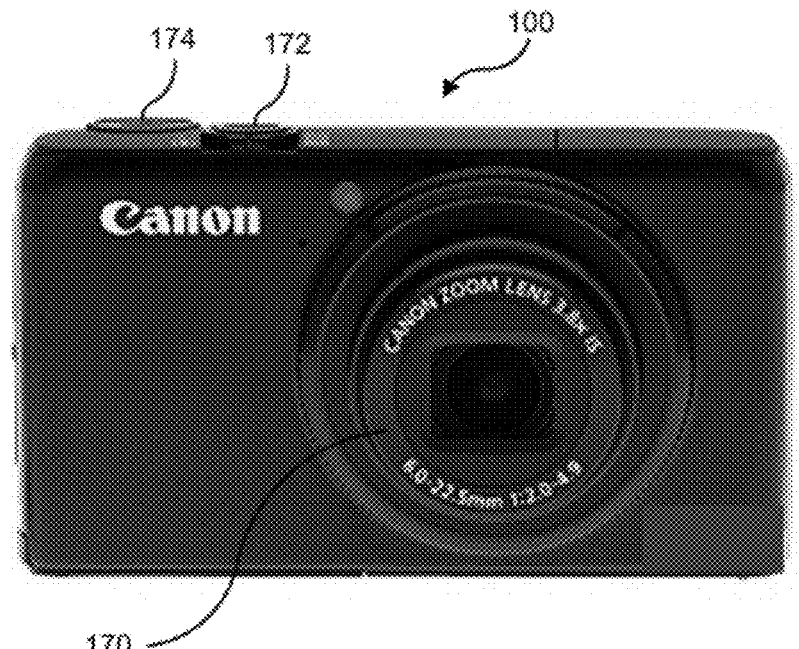
FIGS. 3A and 3B illustrate, respectively, a front and a rear view of one embodiment of an image capturing apparatus.
Figure 3B:
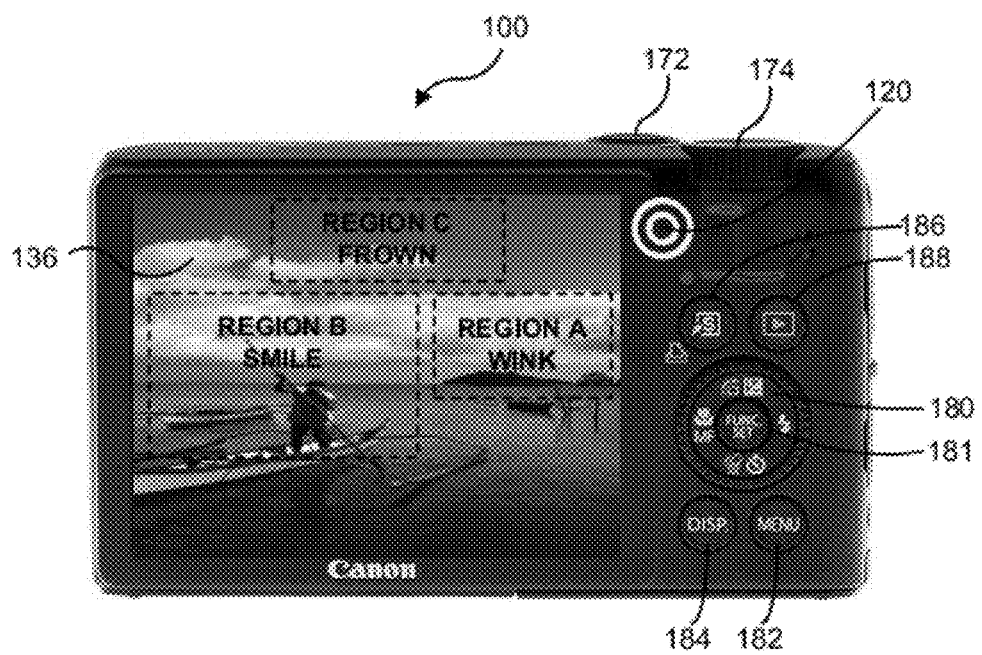

FIGS. 3A and 3B illustrate, respectively, a front and a rear view of one embodiment of an image capturing apparatus 100. The rear of the image capturing apparatus 100 includes a second capturing unit 120 configured to capture an image of one or more eyes and other facial characteristics of the user. The image capturing apparatus 100 also includes a lens 170, a shutter switch 172, a mode dial 174, a control dial 180, a function set button 181, a menu button 182, a display button 184, a shortcut button 186, and a playback button 188. The image capturing apparatus may also include a variety of other buttons and/or switches such as, for example, a macro selection button, a multi-screen reproduction and page-advance button, a flash setting button, and a single-shot/serial-shot/self-timer selection button. The mode dial 174 may include a variety of manual and semi-automatic exposure modes including, but not limited to, plus Auto, a high ISO (International Organization for Standardization) mode, Scene, Movie modes, and a user-programmable Custom mode. FIGS. 3A and 3B merely illustrate one embodiment, and the image capturing apparatus 100 shown therein may, alternatively, be configured differently.

Figure 4:
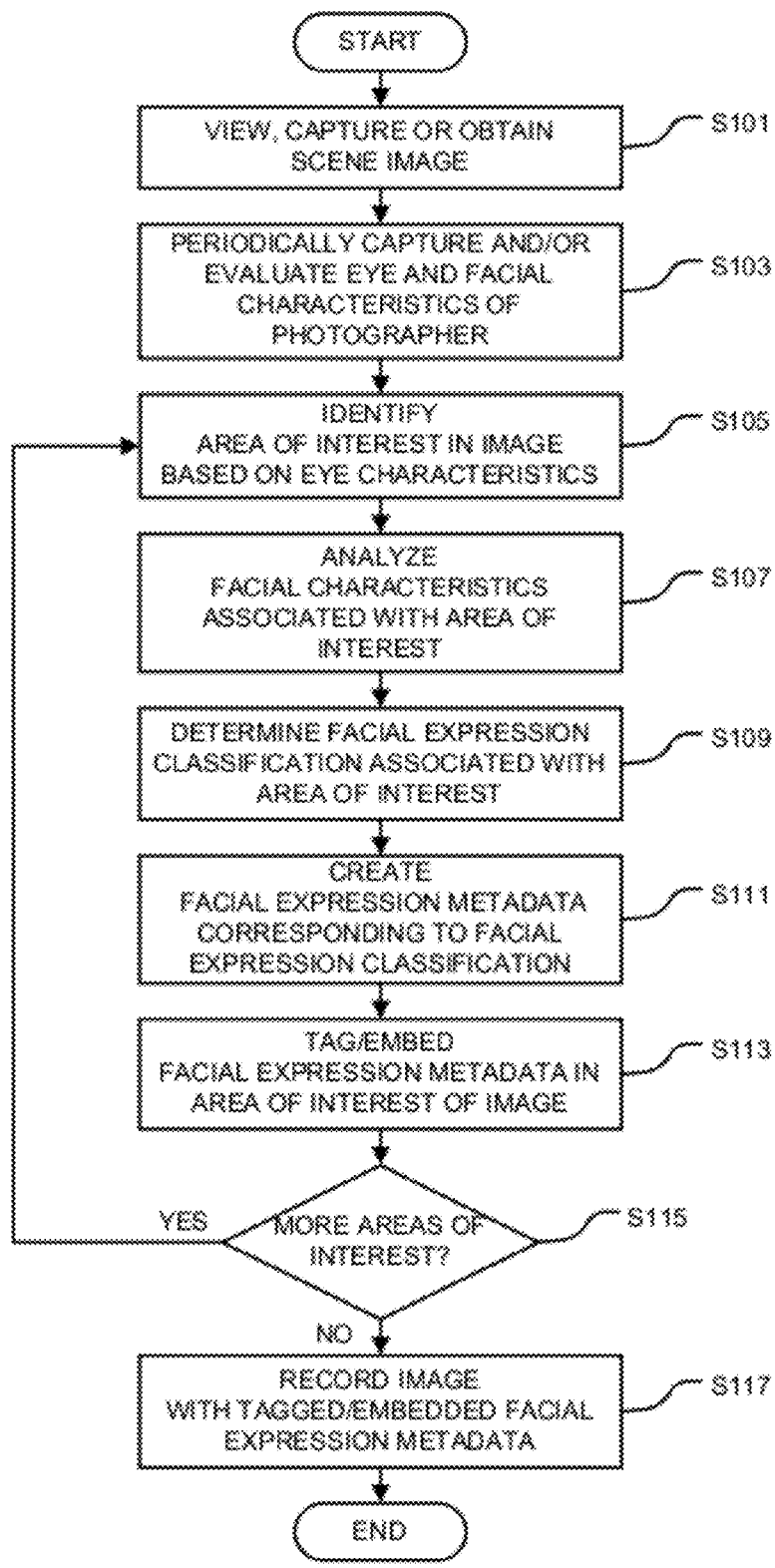
FIG. 4 is a flowchart illustrating one embodiment of an image capturing look transform method.

FIG. 4 is a flowchart illustrating one embodiment of an image capturing look transform method. The method may be performed by the image capturing apparatus 100 when the system control unit 150 executes a control program stored in the memory 132.

Below, first a brief overview of the method is presented, followed by a more detailed review. In step S101, an image capturing apparatus 100 views, captures, and/or obtains a scene image. In step S103, eye and facial characteristics of a photographer are periodically captured by the second image capturing unit 120. In step S105, the image capturing apparatus 100 identifies an area of interest in the scene image based on eye characteristics. Next, in step S107, facial characteristics associated with the area of interest are analyzed. In step S109, a facial expression classification associated with the area of interest is determined. Moving on to step S111, facial expression metadata corresponding to the facial expression classification is created. In step S113, the facial expression metadata associated with the area of interest is tagged and/or embedded within the image. In step S115, a determination is made whether there are more areas of interest within the image. Flow returns to step S105 when there are more areas of interest within the image. Otherwise, flow advances to step S117, where the image and the tagged and/or embedded facial expression metadata are recorded, for example on the memory card 200.

Following is a more detailed review of the method. For ease of reference the method will be described as being performed by the image capturing apparatus 100, but the method may be performed by other devices as well. First, in step S101, a photographer operates the image capturing apparatus 100 normally (e.g., powering on the image capturing apparatus 100, directing the image capturing apparatus 100 at a desired scene to view the scene). The photographer may depress the shutter button 172 to capture and view an image, or the photographer may view an image that has been previously stored. The photographer may view the image through the display unit 136.

Flow then advances to step S103, where eye and facial characteristics of the photographer are periodically captured and/or analyzed, for example by the second image capturing unit 120. The second image capturing unit 120 may be configured as one or more cameras and sensors on the back of the image capturing apparatus 100 and may periodically capture images of and/or may evaluate eye and facial characteristics of the photographer. The period may be any predetermined period of time, for example a micro-second, 2 seconds, 5 seconds, 10 seconds, or 15 seconds.

Flow then advances to step S105 where an area of interest in the image is identified based on eye characteristics. For example, the image capturing apparatus 100 determines a particular direction of interest by detecting certain eye characteristics or parameters. Initially, eye detection and capture is performed based on the facial image of the photographer captured by the second image capturing unit 120. Eye detection and capture can include, for example, localization of the iris from the overall image of the eye or face. Localization can be achieved by finding landmark features of the limbic boundary and the pupil of the iris and removing background features of the eye, including, for example, the eye lashes, the eyelids, and the sclera. Images of the iris can depict useful information including, for example, the color gradient within the iris, iris color, total iris texture energy and/or quality of the iris. Prior to recognition, the iris may be localized from the overall image of an eye or face.

Certain eye parameters can be used to determine the particular direction of interest of the photographer, including, for example, a corneal reflection which determines the angular difference between movement of a particular eye based on a stationary light beam reflection from a light beam directed at the particular eye (e.g., an infrared light beam) and scanning of the eye region with a camera and analyzing the resultant image.

Eye-tracking techniques include, but are not limited to, neural networks, hidden Markov models, adaptive digital filters, Least Mean Squares Methods, dispersion or velocity methods, etc. The techniques may be based on typical characteristics of known eye-trackers including, for example, sampling frequency and/or the like. The image capturing apparatus 100 can scan the eye region of the photographer and analyze the result using a variety of eye detection parameters, techniques, and algorithms.

Flow then advances to step S107 where facial characteristics of the photographer associated with the area of interest are analyzed. A part of the facial image corresponding to the face of the photographer is extracted from the facial image and aligned based on detected facial features of the photographer. A set of characteristics or parameters of the extracted part of the image is then created using one or more image filters including, for example, integral film filters, Gabor filters, Haer wavelets, box filters, motion detectors, spatio-temporal filters, local orientation filters and/or the like.

The image capturing apparatus 100 may be configured to utilize a variety of facial expression recognition techniques known in the art, including, for example, techniques where feature points are extracted from neutral reference images and distances between the feature points are computed. Facial expressions are then determined by similarly computing the distances between the feature points in the input images and calculating the values of the difference between the respective distances. Techniques are also known where corners of the mouth and corners of the left and right eyes in an image are detected, and facial expressions are determined based on the ratio of the long side to the narrow side in a rectangle produced by these four points. Techniques are also known where neutral reference images are prepared in advance for use in the facial recognition. The input images and the neutral references prepared in advance are then wavelet-transformed to compute the mean power of frequency signal for each band. Facial expressions are then determined by computing the difference between the respective mean powers.

Additionally, techniques are also known where eyebrow motion and other facial expression elements and facial expression information are obtained from feature locations and facial element codes are computed based on the facial expression element information, whereupon facial expression element codes are employed in a prescribed conversion formula to compute an emotional value. A training method can be used where a plurality of neutral state image data and image data for a variety of facial expressions are obtained and analyzed to determine certain quantification values associated with each type of facial expression, such as a frown, wink, smile, anger, happiness, etc. The facial expression may be quantified according to a set of metrics where position tracking and orientation estimation may be done using automated image processing tools.

The image capturing apparatus 100 may alternatively be configured to use a code book for expression recognition. An exemplary code book contains a plurality of different expressions that have been previously captured from one or more individuals, and can be stored using particular identifiers (IDs) including, for example, facial expression 1, facial expression 2, . . . , facial expression N. For example, facial expression 1 could represent a frown and facial expression 2 could represent a smile. A transformation function takes geometric deformations that are associated with expressions of a training set and applies them to the expressions of the code book so that the code book expressions are realistic representations of the expressions.

Flow then advances to step S109 where a facial expression classification is determined for the face of the photographer that is associated with the area of interest. A facial expression classification can be determined based on a value indicating a relative amount of facial action that occurs in the face of the photographer. A facial expression classification can also be determined by generating a score vector based on a combination of relative likelihoods that respective facial features of the photographer will be present in a plurality of images of the photographer. The score vector can include a value for each of a plurality of action units and can quantify a probability of a presence of each of the plurality of action units in the face of the photographer shown in the image.

Facial expression classifications can be assigned for a variety of facial characteristics, such as stretching of the lip, raising the upper eyelid, dropping of the jaw, raising of the outer brow, tightening of the lower eyelid, raising of the inner brow, and/or the like. A variety of facial expression classifications can be constructively employed in the present invention, including, but not limited to a smile, a frown, a grimace, a grin, a wink, a sneer, a wince, a laugh, a straight face, joy, happiness, sadness, dislike, concern, displeasure, indifference, surprise, fear, anger, disgust, annoyance, love, awe, surprise, acceptance, rage, boredom, amazement, distraction, and interest.

Figure 5:
FIG. 5 shows illustrative examples of embodiments of facial expression classifications.
Figure 5:
Figure 5:
Figure 5:
Figure 5:
Figure 5:
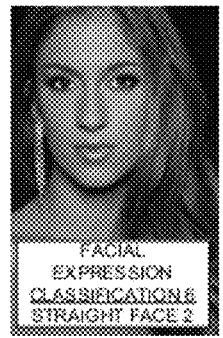
Figure 5:
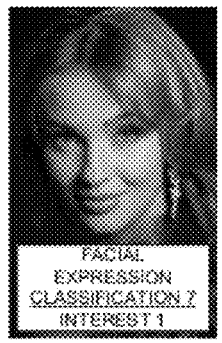
Figure 5:
Figure 5:

FIG. 5 shows illustrative examples of embodiments of facial expression classifications. FIG. 5 includes nine images identified with facial expression classifications 1 through 9, respectively, where the particular facial expression classifications include dislike 1, dislike 2, indifference 1, indifference 2, straight face 1, straight face 2, interest 1, smile 1, and smile 2. Any number of other images can be used that identify a wide variety of facial expression classifications.

Next, in step S111, the image capturing apparatus 100 creates facial expression metadata corresponding to the facial expression classification. Metadata provides information that can be associated with the digital data corresponding to the images and may include the date, time, and location an image was captured.

In accordance with the present invention, the image capturing apparatus 100 creates metadata that corresponds to the facial expression of the photographer and that is associated with a particular area of interest in a captured image. For example, referring to FIG. 3B, three areas of interest are illustrated: Region A, Region B, and Region C. Region A is associated with a facial expression of a "wink," Region B is associated with a facial expression of a "smile," and Region C is associated with a facial expression of a "frown." The image capturing apparatus 100 is configured to create metadata indicating a "smile" is associated with Region B, a "frown" is associated with Region C, and a "wink" is associated with Region A. Accordingly, the photographer can place the memory card in a computer at a subsequent period of time and can conveniently index and view images having a "smile" associated with the areas of interest. Flow then advances to step S113 where the facial expression metadata created by the image capturing apparatus 100 is tagged and/or embedded in the image and is associated with the area of interest.

Flow then advances to step S115 where a determination is made as to whether the photographer has any more areas of interest in the image. The determination can be made through the use of a GUI (graphical user interface) on the display unit 136. For example, the image capturing apparatus may query the photographer whether there are more areas of interest. Flow returns to step S105 if the photographer answers "NO". Flow advances to step S117 if the photographer answers "YES".

The systems and methods described herein may be implemented on a variety of computer or network architectures, including, for example, hand-held or laptop devices, personal computers (PCs), server computers, minicomputers, client devices, set top boxes, programmable consumer electronics, network PCs, mainframe computers, micro-processor based systems, multiprocessor systems, gaming consoles, and distributed computing environments that include any combination of the above systems or devices.

The processing described in the above embodiments may be realized by providing a computer readable storage medium that stores program instructions realizing the above-described functions, to a computer system or apparatus. When read and executed by the computer system or apparatus, the program instructions stored in the computer readable storage medium cause the computer system or apparatus to implement the functions of the above-described embodiments. In this case, the program instructions read from the storage medium realize the functions according to the embodiments, and the storage medium storing the program instructions constitutes the invention. A storage medium includes, for example, a floppy disk, a hard disk, an optical disk, a magneto-optical disk, a CD-ROM (Compact Disc (CD) Read Only Memory), a CD-R (CD Recordable), CD-RW (CD Rewritable), a magnetic tape, a non-volatile memory card, and a ROM.

Furthermore, the functions according to the above embodiments are realized not only by executing the program instructions read by the computer. The present invention also includes a case where an OS (operating system) or the like working on the computer performs part of or all of the processes in accordance with designations of the program instructions and realizes the functions according to the above embodiments.

Furthermore, the program instructions may be written in a function expansion card which is inserted into the computer system or apparatus or in a memory provided in a function expansion unit which is connected to the computer system or apparatus. Thereafter, a processor or the like contained in the function expansion card or unit may perform part of or all of the processes in accordance with designations of the program instructions and may realize the functions of the above embodiments.

While the present invention has been described with reference to certain illustrative embodiments, it is to be understood that the invention is not limited to the disclosed embodiments. The scope of the following claims is to be accorded the broadest interpretation so as to encompass all modifications, equivalent structures, and functions.

What is claimed is:

1. An image capturing apparatus comprising:
a first image capturing unit configured to capture an image of a scene for a user;
a second image capturing unit configured to capture an image of the user;
an identification unit configured to identify at least one region of interest of the scene based on a combination of eye and facial characteristics of the user of the image capturing apparatus during an image capturing operation;
a processing unit configured to analyze at least facial characteristics of the user associated with each region of interest during the image capturing operation;
a determining unit configured to determine a facial expression classification associated with each region of interest based on corresponding analyzed facial characteristics for each region during the image capturing operation;
a recording unit configured to record facial expression metadata based on information representing the at least one region of interest and the facial expression classification associated with an image captured during the image capturing operation; and
a rendering unit configured to render the image using the recorded facial expression metadata.

2. The image capturing apparatus according to claim 1, further comprising an area of interest identification unit configured to identify an area of interest of a user.

3. The image capturing apparatus according to claim 2, wherein the area of interest of the user is determined based on detected eye characteristics of the user.

4. The image capturing apparatus according to claim 1, further comprising a facial characteristics analyzing unit configured to analyze facial characteristics of a user.

5. The image capturing apparatus according to claim 1, further comprising a facial expression classification unit configured to determine a facial classification of a user.

6. The image capturing apparatus according to claim 5, wherein the facial classification of the user is determined based on based on analyzed facial characteristics of the user.

7. The image capturing apparatus according to claim 1, further comprising a facial expression metadata creation unit configured to create facial expression metadata.

8. The image capturing apparatus according to claim 7, wherein the facial expression metadata is created based on a facial classification of the user.

9. The image capturing apparatus according to claim 7, wherein the facial expression metadata is associated with an identified area of interest.

10. The image capturing apparatus according to claim 1, wherein the first image capturing unit is further configured to provide an indication to the user of the at least one region of interest of the scene during the image capturing operation.

11. An image capturing method comprising:
capturing an image of a scene for a user using a first image capturing unit;
capturing an image of the user using a second image capturing unit;
identifying at least one region of interest of the scene based on a combination of eye and facial characteristics of the user of the image capturing apparatus during an image capturing operation;
analyzing at least facial characteristics of the user associated with each region of interest during the image capturing operation;
determining a facial expression classification associated with each region of interest based on corresponding analyzed facial characteristics for each region during the image capturing operation;
recording facial expression metadata based on information representing the at least one region of interest and the facial expression classification associated with an image captured during the image capturing operation; and rendering the image using the recorded facial expression metadata.

12. The image capturing method according to claim 11, further comprising identifying an area of interest of a user.

13. The image capturing method according to claim 12, further comprising determining the area of interest of the user based on detected eye characteristics of the user.

14. The image capturing method according to claim 11, further comprising analyzing facial characteristics of a user.

15. The image capturing method according to claim 11, further comprising determining a facial classification of a user.

16. The image capturing method according to claim 15, further comprising determining the facial classification of the user based on based on analyzed facial characteristics of the user.

17. The image capturing method according to claim 11, further comprising creating facial expression metadata.

18. The image capturing method according to claim 17, further comprising creating the facial expression metadata based on a facial classification of the user.

19. The image capturing method according to claim 17, further comprising associating the facial expression metadata with an identified area of interest.

20. A computer readable storage medium storing instructions that, when executed by a computing system, cause the computing system to perform the facial recognition method according to claim 11.

* * * * *